United States Patent
Pfeiffer et al.

(10) Patent No.: US 10,350,959 B2
(45) Date of Patent: Jul. 16, 2019

(54) ACTIVE ROLL STABILIZER OF A MOTOR VEHICLE AND METHOD FOR ASSEMBLY

(71) Applicant: ZF Friedrichshafen AG, Friedrichshafen (DE)

(72) Inventors: Daniel Pfeiffer, Berg (DE); Martin Hoffmann, Friedrichshafen (DE); Boris Heberle, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/564,500

(22) PCT Filed: Mar. 14, 2016

(86) PCT No.: PCT/EP2016/055412
§ 371 (c)(1),
(2) Date: Oct. 5, 2017

(87) PCT Pub. No.: WO2016/162172
PCT Pub. Date: Oct. 13, 2016

(65) Prior Publication Data
US 2018/0072128 A1    Mar. 15, 2018

(30) Foreign Application Priority Data
Apr. 8, 2015  (DE) .................. 10 2015 206 274

(51) Int. Cl.
*B60G 21/055*  (2006.01)
*H02K 5/22*  (2006.01)

(52) U.S. Cl.
CPC ......... *B60G 21/0555* (2013.01); *H02K 5/225* (2013.01); *B60G 2202/42* (2013.01); *B60G 2204/202* (2013.01); *B60G 2204/4308* (2013.01)

(58) Field of Classification Search
CPC ........ B60G 21/0555; B60G 2204/4308; B60G 2204/202; B60G 2202/42; H02K 5/225
See application file for complete search history.

(56) References Cited

U.S. PATENT DOCUMENTS 5,204,565 A     4/1993  Sekine et al.
5,580,079 A *  12/1996  Pradel ................ B60G 21/0555
                                                                    267/277
(Continued)

FOREIGN PATENT DOCUMENTS

DE    27 07 288 A1    8/1978
DE    34 26 973 A1    1/1986
(Continued)

OTHER PUBLICATIONS

German Office Action Corresponding to 10 2015 206 274.0 dated Dec. 21, 2015.
(Continued)

*Primary Examiner* — Darlene P Condra
(74) *Attorney, Agent, or Firm* — Davis & Bujold PLLC; Michael J. Bujold

(57) ABSTRACT

An active roll stabilizer of a motor vehicle including an actuator (8) in the form of a swivel motor arranged so as to rotate about a longitudinal axis of the vehicle. The swivel motor has an essentially cylindrical housing (12) with a cover, first and second stabilizer halves (18, 19) are connected to respective ends of the actuator for the transmission of torque, and a wiring harness (1) has a first end and a second end. The harness includes cables (3, 4, 5) for the transmission of electric power and signals. The first end is connected to the actuator, by way of a plug (2), and the second end is arranged positionally fixed in the vehicle at a cable transfer point (20). The cover forms a dry space and (Continued)

has a plug receiving opening, in its periphery, into which the plug can be inserted, in the radial direction, and secured.

12 Claims, 3 Drawing Sheets

(56) References Cited

U.S. PATENT DOCUMENTS

| | | | |
|---|---|---|---|
| 6,175,179 B1 | 1/2001 | Hervé | |
| 7,309,074 B2* | 12/2007 | Taneda | B60G 17/019 280/124.106 |
| 7,615,975 B2 | 11/2009 | Tsukashima et al. | |
| 7,819,036 B2* | 10/2010 | Haneball | F16H 25/20 74/89.33 |
| 8,395,047 B2* | 3/2013 | Adachi | B60L 3/0007 174/74 R |
| 2007/0017770 A1* | 1/2007 | Oh | H01R 13/6666 192/84.961 |
| 2008/0106055 A1* | 5/2008 | Pinkos | B60G 3/20 280/124.106 |
| 2013/0323948 A1 | 12/2013 | Lopes et al. | |
| 2016/0193892 A1 | 7/2016 | Pfeiffer et al. | |

FOREIGN PATENT DOCUMENTS

| | | |
|---|---|---|
| DE | 44 35 491 A1 | 5/1995 |
| DE | 697 06 844 T2 | 5/2002 |
| DE | 10 2004 063 814 A1 | 7/2006 |
| DE | 11 2005 000 359 T5 | 5/2009 |
| DE | 10 2012 017 908 A1 | 3/2014 |
| DE | 10 2013 215 859 A1 | 2/2015 |
| EP | 1 746 708 A2 | 6/2006 |
| EP | 2 587 642 A2 | 5/2013 |

OTHER PUBLICATIONS

International Search Report Corresponding to PCT/EP2016/055412 dated Apr. 18, 2017.
Written Opinion Corresponding to PCT/EP2016/055412 dated Apr. 18, 2017.

* cited by examiner

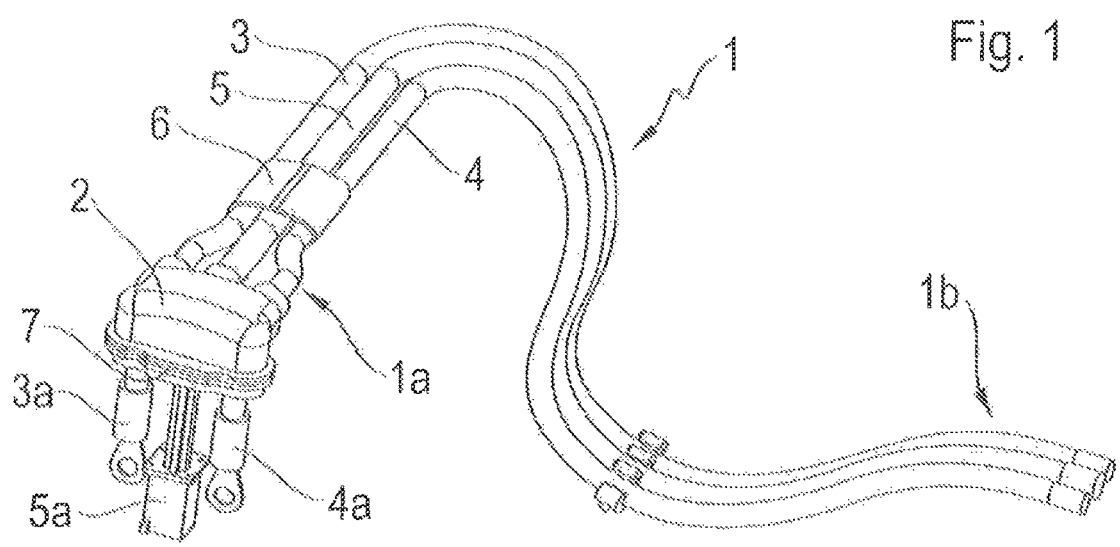
Fig. 1
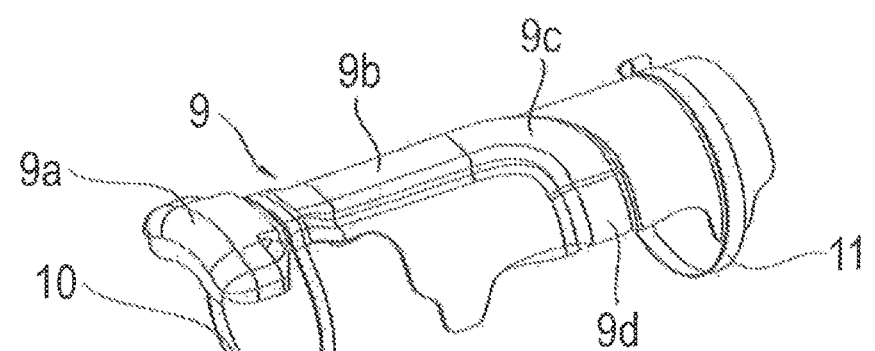
Fig. 2
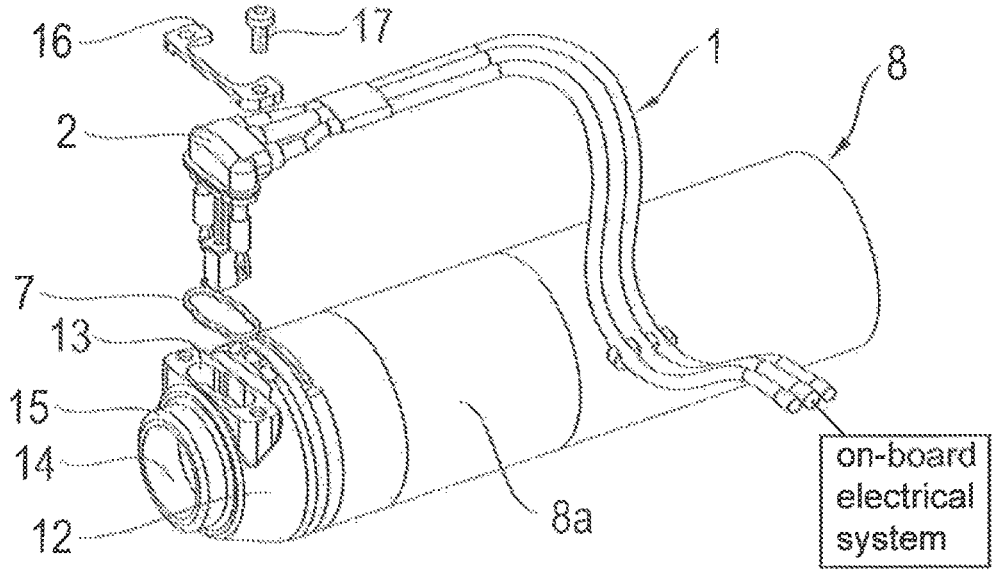

ACTIVE ROLL STABILIZER OF A MOTOR VEHICLE AND METHOD FOR ASSEMBLY

This application is a National Stage completion of PCT/EP2016/055412 filed Mar. 14, 2016, which claims priority from German patent application serial no. 10 2015 206 274.0 filed Apr. 8, 2015.

FIELD OF THE INVENTION

The invention concerns an active roll stabilizer for a motor vehicle and a method for assembling a wiring harness.

BACKGROUND OF THE INVENTION

From DE 10 2013 215 859 A1 by the present applicant an electromechanical actuating drive designed as a swivel motor for the active roll stabilization of a motor vehicle has become known. The swivel motor, also called an actuator, comprises an electric motor with planetary gearing and is connected at the end to a wiring harness that consists of power cables and a signal or sensor cable. The wiring harness has a first end which is connected by way of a first connector or first plug to the actuator, and extends from the first connector in a curve around the longitudinal axis of the actuator as far as its second end, which is in the form of a second plug and is fixed to the vehicle. During active roll stabilization the actuator and hence also the first end of the wiring harness undergo rotational or swiveling movement about the longitudinal axis, while the second end of the wiring harness is positionally fixed. This results in so-termed breathing of the cables, i.e. a change of the curvature of the wiring harness between its two ends, such that due to the rotational or swiveling movement, in one direction the harness is compressed or wound less tightly whereas in the other direction it is wound more tightly or placed under tension.

SUMMARY OF THE INVENTION

One objective of the present invention is to make the most of other potentials as regards the connection of a wiring harness to an electric swivel motor of an active roll stabilizer.

The invention is distinguished by the characteristics specified in the independent Claims and advantageous design features described below.

According to a first aspect of the invention, it is provided that the cover connected to the housing of the actuator forms a dry space and has a plug receiving opening arranged at the periphery, into which the plug can be inserted in the radial direction and fixed. This has the advantage that the electrical connection of the wiring harness on the side of the actuator can be made with minimum use of structural space, especially in the axial direction. Furthermore it is advantageous that the electrical contacts are arranged in a protected manner in a dry space, i.e. in a space closed off from the outside and protected against corrosion.

In a preferred embodiment, the cover has an interface with an end of the stabilizer and an assembly opening in the area of the interface, which allows access to the contacts. This makes it possible, after the plug has been inserted radially into the dry space, to fix the electrical contacts by accessing them through the assembly opening at the end. This forms a durable electric contact between the electric motor or integrated control device and the on-board electrical system of the vehicle.

In a further preferred embodiment, the plug is in the form of a right-angle plug comprising a radial section held in the plug receiving opening and an axial section extending out of the plug receiving opening. By virtue of the right-angle plug, the wiring harness is deflected through approximately 90 degrees, i.e. from a radial direction inside the cover to an axial direction outside the cover. This optimizes the contacting of the wiring harness in relation to fitting space.

According to another preferred embodiment, the right-angle plug is made by injection molding around the angled portion of the wiring harness or the bent cables. In this way the bend in the wiring harness is held fast in a solid plastic body and the individual cables are relieved of stress in the area of the bend.

In a further embodiment the contacts can be angled by means of a lead-frame. The conductors are then connected to the lead-frame in the injection molding.

In another preferred embodiment, the wiring harness extends out of the axial section and is laid in the axial direction along the housing, i.e. the cable is guided snugly against the cylindrical housing of the actuator so that it takes up only minimal space.

According to a further preferred embodiment, the wiring harness is first laid in the axial direction as far as a deflection area, where it undergoes a deflection. Depending on the assembly conditions, the deflection area can be located at any desired position in relation to the longitudinal extension of the actuator housing, preferably in the middle. The deflection can take place transversely, i.e. at about 90 degrees, or even obliquely, i.e. at an acute or obtuse angle relative to the axial direction, in each case in the direction toward the cable transfer point positionally fixed in the vehicle.

In a further preferred embodiment, the wiring harness laid along the housing passes through a correspondingly designed sheath and is fixed, the sheath being clamped or fixed onto the housing. Thus, the sheath has at least three functions, namely, besides guiding the wiring harness, also holding it in place and protecting it.

In another preferred embodiment, the sheath, at least in part, surrounds more than half the circumference of the housing so that it can be positioned and pre-fixed on the housing by elastic deformation. After that the sheath is fixed in place, preferably by means of clamping strips around the housing. Alternatively the sheath can be materially bonded onto the housing (i.e. adhesive bonding or welding), or by means of fixing elements with interlock such as rivets or screws.

According to a further preferred embodiment, the sheath has a covering cap, which is adapted to the shape of the right-angle plug section projecting out of the plug receiving opening and fits over it like a cap. In this way the outer part of the right-angle plug is protected in particular against external effects and damage According to another preferred embodiment, the sheath has a recess extending in the longitudinal direction of the cable, whose cross-section matches that of the wiring harness so that the harness can be held in it. Thus, the wiring harness is guided and fixed on the housing by the channel-like recess.

In a further preferred embodiment, the recess extends along the full extent of the wiring harness on the housing and has an axially extending section, a deflection area and an end section that extends transversely or obliquely relative to the axial direction. Thus, the wiring harness is guided and fixed close to the housing from the right-angle plug as far as the end section. By virtue of this design the wiring harness is guided in a spiral toward the positionally fixed cable transfer point.

According to another aspect of the invention, in a method for assembling the wiring harness the following process steps are involved: first, the actuator and the wiring harness are prepared so that the actuator has a cover with a plug receiving opening and an assembly opening, whereas the wiring harness has a first end with a plug. In the next step the radial section of the plug is inserted radially into the plug receiving opening, i.e. including the electrical contacts of the individual cables projecting at the end of the radial section. In a further step, by virtue of the access allowed through the assembly opening the electrical contacts are fitted and made fast so that a durable electric connection is formed to the electric motor and to the control device. The electric end-contacts can for example be in the form of contact eyelets which are fitted over radially directed contact bolts and fixed thereto.

In a further step, which can also be carried out in advance, the plug is sealed, fixed and mounted firmly relative to the plug receiving opening. The sealing takes place when the plug is inserted and the fixing by fixing means such as fixing pins.

In a further process step, the wiring harness emerging from the axial section of the right-angle plug is laid on the housing in the desired direction and guided and fixed by positioning a sheath over it. Thus, the wiring harness is held onto the housing in a form-enclosed manner by fitting on the sheath.

In a further process step the sheath is clamped onto the housing, preferably by means of clamping strips, which are easy to fit.

According to a further preferred variant, one of the two stabilizer ends is connected to the cover in the area of the interface of the cover by a material-bond, preferably by welding. This closes the assembly opening and the dry space in which the electrical contacts are arranged is closed off and sealed from the outside.

In another preferred variant, the second, still free end of the wiring harness is connected to the on-board electrical system of the vehicle in the area of the cable transfer point by means of a suitable plug connection. The actuator is then functional as an active roll stabilizer, and during the swivel movements that occur in operation the flexible wiring harness can "breathe", i.e. it can follow the swivel movements without undue mechanical strain.

BRIEF DESCRIPTION OF THE DRAWINGS

An example embodiment of the invention is illustrated in the drawings and will be described in greater detail below, whereby from the description and/or the drawings further features and/or advantages may emerge. The drawings show:

FIG. 1: A wiring harness with a plug according to the invention,

FIG. 2: An exploded view of an actuator with a cover, the wiring harness with its plug, and a sheath.

DETAILED DESCRIPTION OF THE PREFERRED EMBODIMENTS

Figure 3:
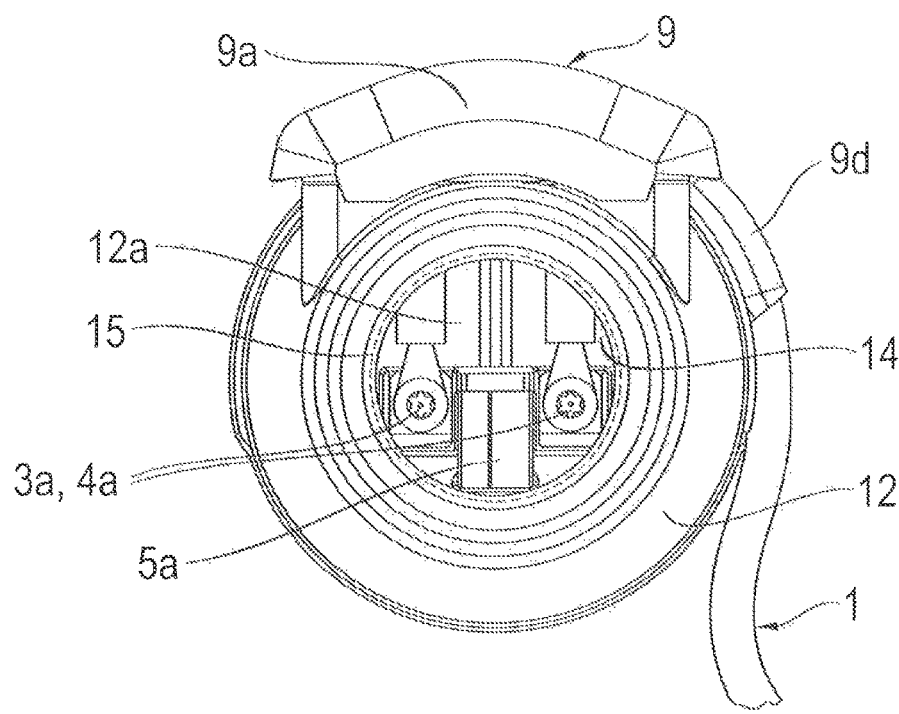
FIG. 3: A view in the axial direction, showing the cover with its assembly opening.

FIG. 1 shows a wiring harness 1 with a plug 2 for an actuator (not shown here). In this case the wiring harness 1 comprises, for example, three cables, namely a first power cable 3, a second power cable 4 and a signal cable 5, which are held together by a binding band 6. The wiring harness 1 has a first end 1a which is held in the plug 2, and a second end 1b which is connected to a cable transfer point (not shown here). With the power cables 3, 4 are associated power contacts 3a, 4a on the plug 2, also known as electrical contacts, whereas a signal plug 5a, also called the signal contact 5a, is associated with the signal cable 5. Around the periphery of the plug 2 is arranged an all-round seal 7.

FIG. 2 shows an exploded view of an actuator 8 in the form of an electric swivel motor, also called a regulator, the wiring harness 1 with its plug 2, and a sheath 9 with clamping strips 10, 11. The actuator 8 has an approximately cylindrical housing 8a connected at its end to a cover 12 shaped approximately like a truncated cone with a plug receiving opening 13 in the form of a perforation at its circumference and, at its end, an assembly opening 14. The circular assembly opening 14 is delimited by a circular surface 15 which forms an interface with an end (not shown here) of a first stabilizer half. The sheath 9, which can be in the form of a shaped sheet-metal component or even a plastic component, is essentially of semi-cylindrical shape whose radius matches the radius of the housing 8a of the actuator 8. At its end the sheath 9 has an integrally formed cap 9a adapted to the shape of the plug 2. The sheath 9 also has a channel-like, outward-extending recess 9b, 9c, 9d, which follows the course of the wiring harness 1. An axial section 9b merges via a curved or deflection section 9c into a transversely extending exit section 9d.

FIG. 2 also shows clearly how the parts shown can be assembled. First, the plug 2 is inserted radially into the plug receiving opening 13, while at the same time the seal 7 is fitted. Then, a fixing or clamping plate 16 is screwed to the cover 12 with fixing screws 17 so that the plug 2 is fixed to the cover 12. After that the sheath 9 can be fitted, on one side with its cap 9a around the plug 2 and on the other side with the wiring harness 1 held in the channel-like recess 9b, 9c, 9d. The sheath 9 surrounds the periphery of the housing 8a and thereby acts as an elastic clamp, which forms a friction-force connection with the housing 8a as a pre-fixing means. Finally the clamping strips 10, 11 can be fitted, which connect the sheath 9 and with it the wiring harness 1 to the housing 8a in a form-enclosing manner.

FIG. 3 shows a view in the axial direction of the cover 12 with its assembly opening 14. In the area of the circular assembly opening 14—as viewed in the axial direction—are arranged the two electrical contacts 3a, 4a of the power cables 3, 4 and the signal plug 5a of the signal cable 5, which are accordingly accessible in the axial direction through the assembly opening 14, for example by a screwdriver tool. Thus the contacts 3a, 4a and the plug 5a inserted in the radial direction can be finish-mounted, i.e. fastened durably so that electrical connection is established. Since the cover 12 forms a so-termed dry space 12a in its interior, the electrical contacts 3a, 4a and the signal plug 5a are protected against moisture and dirt. The assembly opening 14 is closed after the final assembly, in which a stabilizer end (end of a stabilizer half) is welded in the region of the interface 15, which is explained and illustrated below in conjunction with FIG. 4.

Figure 4:
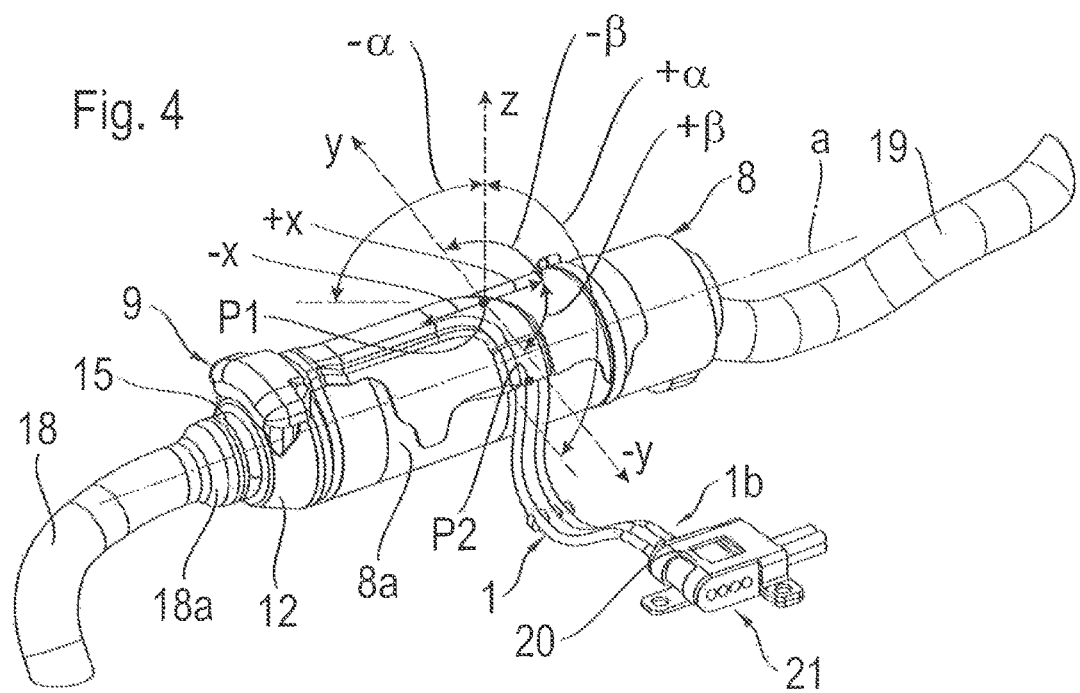
FIG. 4: The actuator with the wiring harness and stabilizer half connected to it.

FIG. 4 shows the actuator 8, which has a longitudinal and swivel axis a, with welded-on, incompletely shown stabilizer halves 18, 19 which are part of an active roll stabilizer whose ends not shown are connected to the wheel carriers of a vehicle axis. The first stabilizer half 18, on the left in the figure, has a stabilizer end 18a which is butt-welded to the cover 12 around the interface 15 and so hermetically seals the assembly opening 14 (FIG. 3) and the inside of the cover 12, forming the dry space 12a. The second stabilizer half 19 is connected to a drive output member (not shown) of the actuator 8. At its second end 1b, the wiring harness 1 is connected at a positionally fixed cable transfer point 20, via a connector 21, to an electrical current source of the vehicle and a control device (not shown).

The laying of the wiring harness 1 from the actuator 8 to the cable transfer point 20, as shown in the drawing, is only an example. In relation to the position of the actuator 8 in the vehicle, the cable transfer point 20 can be arranged elsewhere so that the laying of the wiring harness 1 will be different. For this, on the housing 8a, a reference point P1 as origin for the co-ordinates is shown. The arrows +x, −x indicate the axial direction or a displacement of the reference point P1 in the direction of the longitudinal axis a. The angle +α, −α denotes a positive or negative circumferential angle or a curvature amount on the circumference of the actuator housing 8a, i.e. in a y-z plane. In the example embodiment shown, the circumferential angle +α corresponds to the curve between the reference point P1 and a further reference point P2, which marks the transfer or exit-point of the wiring harness 1. In the example embodiment shown, the circumferential angle between the first and second reference points P1, P2 would be about 90 degrees. A third angle, denoted as +β, −β relative to the x-direction, stands for the deflection of the wiring harness 1 in an x-y plane. In the example embodiment shown, the angle β for the deflection is 90 degrees. If there is any change of these variables x, α, β, the sheath 9 and in particular its channel-like recess 9b, 9c, 9d (FIG. 2) is adapted accordingly so that the desired guiding of the wiring harness 1 over the housing 8a is ensured.

Figure 5:
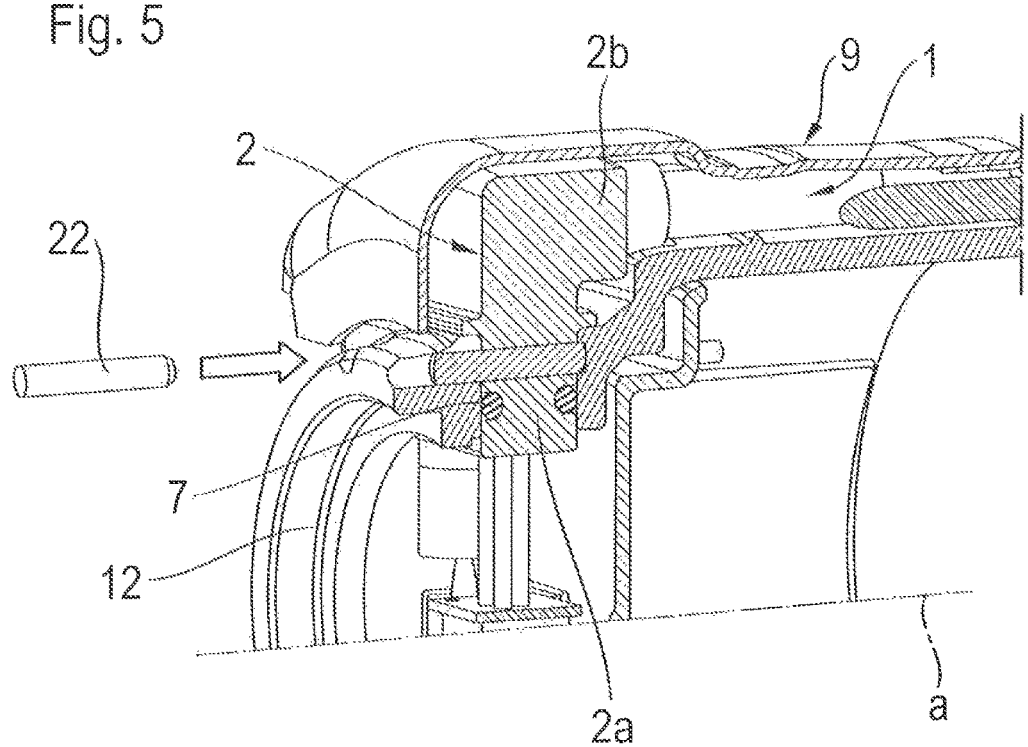
FIG. 5: An axial section through the plug.

FIG. 5 shows an axial section through the plug 2 with the cover 12, i.e. as viewed in a sectional plane that includes the longitudinal axis a. The plug 2 is designed as a right-angle plug and has a radial section 2a and an axial section 2b, such that the radial section 2a is received by the plug receiving opening 13 in the form of a perforation. At the circumference the radial section 2a is sealed relative to the cover 12 by the seal 7 in the form of an O-ring. Otherwise than in the example embodiment shown in FIG. 2 with a clamping plate 16, in this case the plug 2 is fixed in the radial direction by a fixing pin 22 directed approximately parallel to the axis. The right-angle plug 2 with its radial and axial sections 2a, 2b is in the form of an injection molded component, i.e. the wiring harness angled in the area of the plug 2 is embedded in plastic. In this sectional view the covering of the right-angle plug 2 by the cap 9a of the sheath 9 can also be seen.

Figure 6:
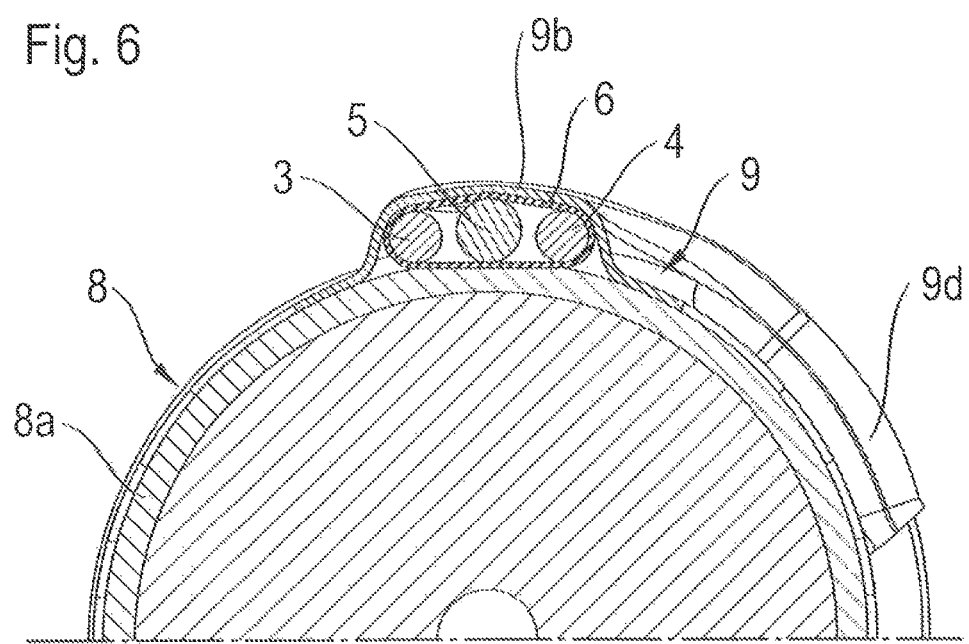
FIG. 6: A cross-section through the sheath with the wiring harness.

FIG. 6 shows a radial section through the housing 8a of the actuator 8, the sheath 9, and through the cables 3, 4, 5 of the wiring harness 1 in the area of the binding band 6 (see FIG. 1). The cross-section of the channel-like recess 9b can be seen clearly here: in this area the sheath clings closely to the wiring harness 1 held together by the binding band 6 and thus fixes it relative to the housing 8a. The exit area 9d of the recess extending in the circumferential direction can also be seen.

INDEXES

1 Wiring harness
1a First end
1b Second end
2 Plug
2a Radial section
2b Axial section
3 First power cable
3a Electrical contact
4 Second power cable
4a Electrical contact
5 Signal cable
5a Signal plug
6 Binding band
7 Seal
8 Actuator
8a Housing
9 Sheath
9a Cap
9b Recess (axial area)
9c Recess (deflection area)
9d Recess (exit area)
10 Clamping strip
11 Clamping strip
12 Cover
12a Dry space
13 Plug receiving opening
14 Assembly opening
15 Interface
16 Clamping plate
17 Screws
18 First stabilizer half
18a Stabilizer end
19 Second stabilizer half
20 Cable transfer point
21 Electrical connection
22 Fixing pin
a Longitudinal and swivel axis
P1 First reference point
P2 Second reference point
x Axial direction, x-axis
y y-axis
z z-axis
α Circumferential angle
β Deflection angle

The invention claimed is:

1. An active roll stabilizer of a motor vehicle comprising:
an actuator in a form of a swivel motor arranged to rotate about its longitudinal axis (a) in the vehicle,
the actuator having an essentially cylindrical housing with a cover,
first and second stabilizer halves being connected to ends of the actuator for transmitting torque,
a wiring harness having a first end and a second end, and the wiring harness comprising cables for transmitting electric power and signals,
the first end being connected to the actuator by a plug and the second end being arranged positionally fixed in the vehicle at a cable transfer point, and
the cover forming a dry space and having a circumferentially arranged plug receiving opening into which the plug is insertable and can be fixed;

the plug is a right-angle plug and has a radial section held in the plug receiving opening and an axial section arranged outside the plug receiving opening;

the wiring harness extends out of the axial section of the plug and lays in an axial direction along the housing; and the wiring harness extends in the axial direction as far as a deflection area and, after the deflection area, the wiring harness extends either transversely or obliquely relative to the axial direction toward the cable transfer point.

2. The roll stabilizer according to claim 1, wherein an end of the plug has contacts that correspond to the cables and the cover has an interface with one end of the first stabilizer half and an assembly opening at an end of the cover, in an area of the interface, which allows access for the fitting of the contacts.

3. The roll stabilizer according to claim 1, wherein the right-angle plug (2) is a plastic injection molded component which can be made by injection molding around an angled wiring harness.

4. The roll stabilizer according to claim 1, wherein the wiring harness, which laid along the housing, is guided and secured by a sheath.

5. The roll stabilizer according to claim 4, wherein the sheath in part surrounds more than half a circumference of the housing and is secured to the housing by at least one of clamping elements and fixing elements.

6. The roll stabilizer according to claim 4, wherein the sheath has an integrally formed covering cap, which covers the right-angle plug.

7. The roll stabilizer according to claim 4, wherein the sheath has a recess that extends in an axial direction of the cables for holding and securing the wiring harness.

8. The roll stabilizer according to claim 7, wherein the recess has a feed section that extends in the axial direction and a deflection section.

9. The roll stabilizer according to claim 8, wherein the recess has an exit section that extends either transversely or obliquely to the axial direction, and is connected with the deflection section.

10. A method of assembling a wiring harness for an actuator of a roll stabilizer in a form of a swivel motor that is arranged to rotate about its longitudinal axis in the vehicle, the actuator having an essentially cylindrical housing with a cover, first and second stabilizer halves connected to ends of the actuator for transmitting torque, a wiring harness having a first end and a second end and the wiring harness comprises cables for transmitting electric power and signals, the first end (1a) of the wiring harness (1) is connected to the actuator by a plug and the second end of the wiring harness is arranged positionally fixed in the vehicle at a cable transfer point, the cover forms a dry space and has a circumferentially arranged plug receiving opening, into which the plug can be inserted and fixed, the method comprising:

preparing the actuator with the cover, which has a plug receiving opening and an assembly opening, and the wiring harness with the plug, inserting a radial section of the plug in a radial direction into the plug receiving opening, fixing electrical contacts of the plug by accessing them through the assembly opening arranged at an end of the cover, sealing and fixing the plug in the radial direction, laying the wiring harness along the housing and accommodating the wiring harness within a sheath, securing the sheath in place onto the housing by at least one of clamping elements and fixing elements, and connecting the second end of the wiring harness to an on-board electrical system of the motor vehicle in an area of the cable transfer point.

11. The method according to claim 10, further comprising attaching the cover, in an area of the interface and the assembly opening, to one end of the first stabilizer half in a materially-bonded manner.

12. An active roll stabilizer of a motor vehicle, the stabilizer comprising:

a swivel motor defining and rotating about a longitudinal axis of the vehicle, and the swivel motor having a cylindrical housing;

a cover having one end, which is connected to a first end of the cylindrical housing, and an opposite end having an assembly opening and forming an interface, the cover having a circumferentially arranged plug reception opening and the cover forming an interior dry space;

a wiring harness having opposite first and second ends and comprising a plurality of cables which transmit electric power and signals, the first end of the wiring harness having a plug with a plurality of cable contacts extending therefrom, and the second end of the wiring harness being positionally secured in the vehicle at a cable transfer point, the plurality of cables of the wiring harness extending from the plug in an axial direction along the housing to a deflection area and, from the deflection area, the wiring harness extends either transversely or obliquely relative to the axial direction toward the cable transfer point;

the plug of the wiring harness being received by the plug reception opening such that the plurality of cable contacts are located within the dry space formed by the cover, and the assembly opening in the cover facilitates access to the dry space and coupling of the plurality of cable contacts to the swivel motor; and a first stabilizer half being connected to an end of the swivel motor opposite the cover and a second stabilizer half being connectable, via the interface, to the opposite end of the cover to transmit torque.

* * * * *